United States Patent
Emmertz et al.

(10) Patent No.: US 9,785,905 B2
(45) Date of Patent: Oct. 10, 2017

(54) OVERALL EQUIPMENT EFFECTIVENESS OF A ROBOT CELL

(71) Applicant: ABB Schweiz AG, Baden (CH)

(72) Inventors: Bertil Emmertz, Vasteras (SE); Henrik Andersson, Stromsholm (SE)

(73) Assignee: ABB Schweiz AG, Baden (CH)

( * ) Notice: Subject to any disclaimer, the term of this patent is extended or adjusted under 35 U.S.C. 154(b) by 187 days.

(21) Appl. No.: 14/430,069

(22) PCT Filed: Sep. 20, 2012

(86) PCT No.: PCT/EP2012/068548
§ 371 (c)(1),
(2) Date: Mar. 20, 2015

(87) PCT Pub. No.: WO2014/044311
PCT Pub. Date: Mar. 27, 2014

(65) Prior Publication Data
US 2015/0220863 A1    Aug. 6, 2015

(51) Int. Cl.
*G06Q 10/06*    (2012.01)
*G06Q 50/04*    (2012.01)
*B25J 9/16*    (2006.01)
*B25J 18/00*    (2006.01)

(52) U.S. Cl.
CPC ........ *G06Q 10/0639* (2013.01); *B25J 9/1602* (2013.01); *G06Q 10/063* (2013.01); *G06Q 50/04* (2013.01); *G05B 2219/32015* (2013.01); *G05B 2219/49071* (2013.01); *Y02P 90/30* (2015.11)

(58) Field of Classification Search
CPC .. G06Q 50/04; G06Q 10/063; G06Q 10/0639; B25J 9/1602; B25J 9/1676; G05B 2219/32015; G05B 2219/39412; G05B 2219/40336; G05B 2219/42217; G05B 2219/49071
See application file for complete search history.

(56) References Cited

U.S. PATENT DOCUMENTS

| | | |
|---|---|---|
| 6,256,556 B1 | 7/2001 | Zenke |
| 6,317,788 B1 | 11/2001 | Richardson |
| 6,327,516 B1 | 12/2001 | Zenke |
| 7,050,937 B2 | 5/2006 | Lee |

(Continued)

OTHER PUBLICATIONS

International Search Report and Written Opinion of the International Searching Authority Application No. PCT/EP2012/068548 Completed: Nov. 22, 2012; Mailing Date: Nov. 29, 2012 12 pages.

(Continued)

*Primary Examiner* — Dale Moyer
(74) *Attorney, Agent, or Firm* — Whitmyer IP Group LLC

(57) ABSTRACT

A method, arrangement and computer program product for determining overall equipment effectiveness of a robot cell including at least one industrial robot involved in producing products. The arrangement includes an effectiveness determination device, which in turn includes an overall equipment effectiveness determining unit that obtains ideal robot operations data of the robot cell, obtains actual robot operations data of the robot cell, and determines the overall equipment effectiveness based on the ideal robot operations data and the actual robot operations data.

16 Claims, 3 Drawing Sheets

(56) References Cited

U.S. PATENT DOCUMENTS

| | | |
|---|---|---|
| 7,379,782 B1 | 5/2008 | Cocco |
| 2002/0138169 A1 | 9/2002 | Sakaguchi |
| 2004/0010344 A1 | 1/2004 | Hiratsuka et al. |
| 2007/0010898 A1* | 1/2007 | Hosek ................ G05B 19/4148 700/2 |
| 2007/0244599 A1 | 10/2007 | Tsai et al. |
| 2008/0097629 A1* | 4/2008 | Weatherhead ......... G05B 17/02 700/67 |
| 2008/0247549 A1 | 10/2008 | Blanc et al. |
| 2009/0157224 A1 | 6/2009 | Blanc et al. |

OTHER PUBLICATIONS

Hirishi Yonezawa, et al.; "Long-Term Operational Experience With a Robot Cell Production System Controlled y Low Carbon-Footprint Senji (Thousand-Handed) Kannon Model Robots and an Approach to Improving Operating Efficiency"; 2011 IEEE International Conference on Automation Science and Engineering, pp. 291-298.

Kren, et al.; "Using Cycle Time to Measure Performance and Control Costs in Focused Factories" Jan. 2002, Internet Citation, pp. 1-18.

* cited by examiner

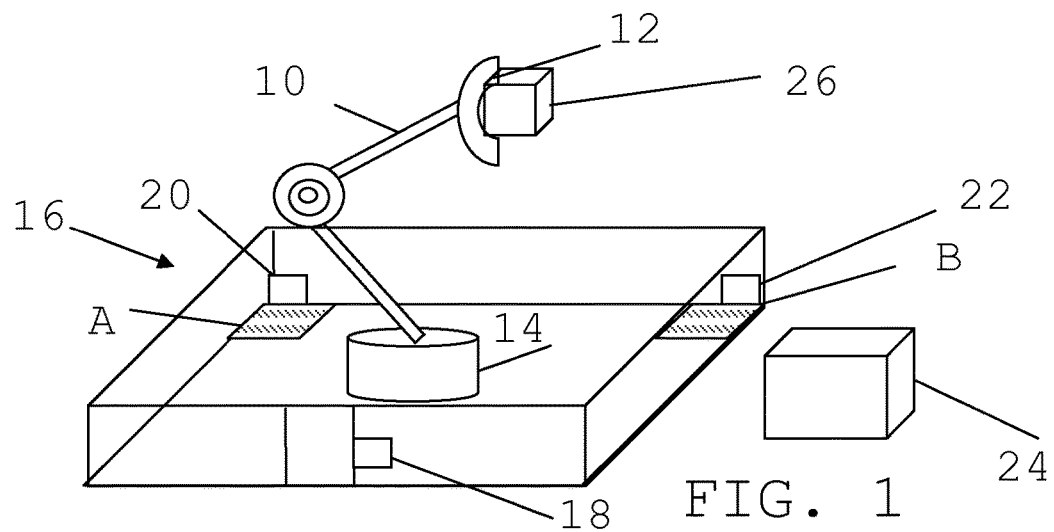
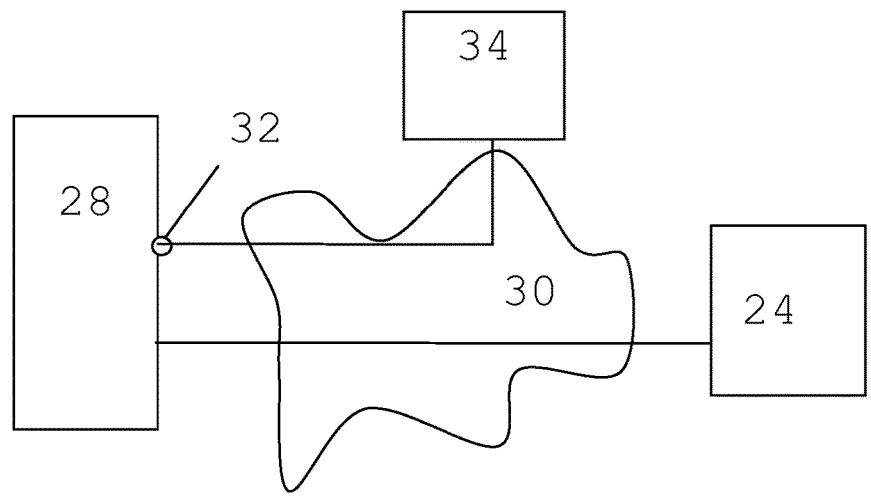
FIG. 2

… (1)

OVERALL EQUIPMENT EFFECTIVENESS OF A ROBOT CELL

TECHNICAL FIELD OF THE INVENTION

The present invention relates to the field of robots. The invention more particularly relates to a method, and arrangement for determining overall equipment effectiveness of a robot cell.

DESCRIPTION OF RELATED ART

The overall equipment effectiveness is a measure that is important to know in order to observe how well a production plant is functioning. Based on this efficiency it is then possible to identify where improvements are needed. The overall equipment effectiveness can thereafter also be used to follow up on the results of the improvements.

In an industrial plant robot cells with industrial robots are often used in the production.

Hence, it is also of interest to determine the overall equipment effectiveness of a robot cell.

This is typically done using a piece of software where a user has to manually enter data on which the calculations are based.

It would in this regard be advantageous if various data provided from a robot cell could be employed in the determining of the overall equipment effectiveness.

SUMMARY OF THE INVENTION

The present invention is therefore directed towards providing an overall equipment effectiveness determination forma robot cell using data obtained via the cell.

One object of the present invention is to provide a method for determining overall equipment effectiveness of a robot cell.

This object is according to a first aspect of the present invention achieved through a method for method for determining overall equipment effectiveness of a robot cell comprising at least one industrial robot involved in producing products, the method being performed by an effectiveness determination device and comprising the steps of: obtaining ideal robot operations data of the robot cell, obtaining actual robot operations data of the robot cell, and determining the overall equipment effectiveness based on the ideal robot operation data and the real time operational data.

Another object of the present invention is to provide an arrangement for determining overall equipment effectiveness of a robot cell.

This object is according to a second aspect of the present invention achieved through an arrangement for determining overall equipment effectiveness of a robot cell comprising at least one industrial robot involved in producing products, where the arrangement comprises an effectiveness determination device and the effectiveness determination device comprises an overall equipment effectiveness determining unit configured to: obtain ideal robot operations data of the robot cell, obtain actual robot operations data of the robot cell, and determine the overall equipment effectiveness based on the ideal robot operations data and the actual robot operations data.

The present invention has many advantages. A user is able to obtain current overall effectiveness calculations with a very low effort since most of the data needed is obtained automatically. The invention is also easy to implement, since it employs already existing elements associated with a robot cell.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:

FIG. 1 schematically shows a robot cell with a robot together with a robot controller, FIG. 2 schematically shows the robot controller and a customer computer separately communicating with a remote service server via a communication network.

DETAILED DESCRIPTION OF EMBODIMENTS

Figure 3:
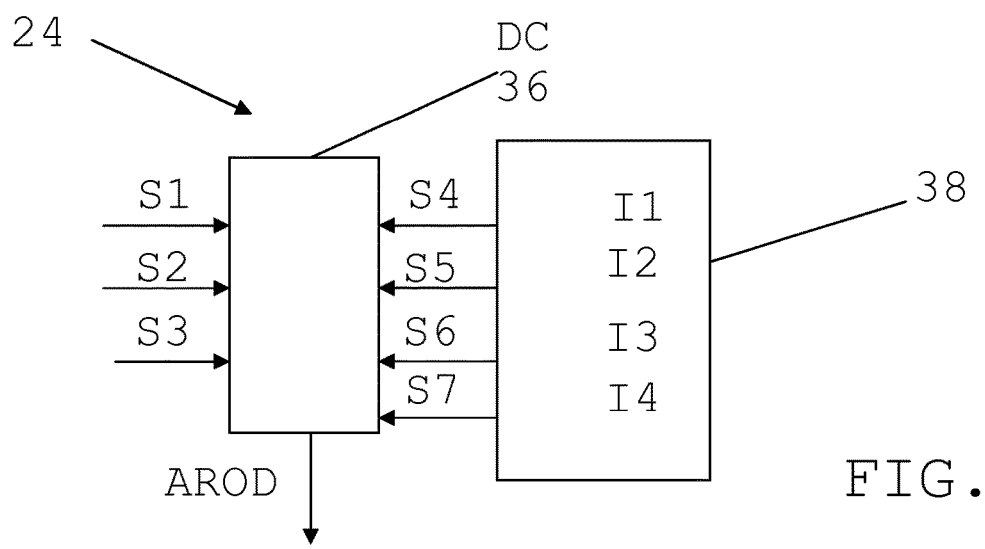
FIG. 3 shows a block schematic of relevant parts of the robot controller, FIG. 4 schematically shows an overall equipment effectiveness determining unit of an effectiveness determining device that may be the remote service server.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

FIG. 1 schematically shows a robot cell 16. The cell 16 comprises an area surrounded by a fence and in this area there is a robot 10 on a foundation 14, which robot 10 is equipped with a tool 12 for holding an object 26 which is a product or is used in the forming of a product. In the handling of the object 26, the robot 10 here takes the object 26 from a first location A using the tool 12, performs a number activities with regard to the object and delivers a product at a second location B.

In or at the cell 16 there may be a number of sensors. As an example there is a first sensor 18 at a door in the fence that is used for a human to enter the cell 16, there is a second sensor 20 at the first location A and there is a third sensor 22 at the second location B. These are just some examples of sensors that can be used. At the cell 16 there is also a robot controller 24. The robot controller 24 is connected to the robot 10 for controlling its movements. However, it is also connected to the above mentioned sensors. It is thus connected to the first, second and third sensors 18, 20 and 22.

The robot 10 is, as was mentioned above, involved in the production of a product. This means that the object 26 being picked up at the first location A may not be identical to what is placed at the second location B. The object 26 may have been joined with other objects or altered in other ways in order to provide a product that leaves the robot cell 16. However, the robot 10 will move one or more tools, such as the tool 12, from the first location A along one or more robot movement paths while performing a number of activities before a product is delivered at the second location B. These paths make up a production cycle. The robot 10 will then repeatedly perform such a production cycle and at the end of each cycle a product is provided.

Furthermore in order to simplify the understanding of the present invention, only one robot in the cell is shown and will be described in the following. It should however be realized that as an alternative there may be more than one robot involved in the production of a product in a cell. The production cycle may then be made up of the robot movement paths of all the robots in the cell.

FIG. 2 schematically shows the robot controller 24 communicating with a remote service server 28 via a communication network 30. The communication network 30 may be a computer communication network, such as the Internet, or a wireless communication network such as LTE, UMTS or GPRS. The remote service server 28 provides a user interface 32 via which a user of a customer computer 34 can provide and access data. The user interface 32 may be accessible via a public communication network, which may also be the Internet, LTE, UMTS or GPRS. This means that the communication network 30 may be used by both the robot controller 24 and the customer computer 34 for communication with the remote service server 28. The user interface 32 may be accessed by the customer computer 34, for instance using a uniform resource locator (URL).

FIG. 3 shows a block schematic of some of the elements of the robot controller 24 that are relevant to the present invention. It should be realized that the robot controller 24 may comprise more elements. However, as these are not central to the understanding of the invention, they have been omitted.

The robot controller 24 comprises a data collector 36 and a robot control unit 38.

The data collector 36 collects a number of signals. It collects a first, second and third signal S1, S2 and S3 that are emitted by the first, second and third sensors as well as a fourth, a fifth, a sixth and a seventh signal S4, S5, S6 and S7 emitted by and received from the robot control unit 38. The data collector 36 also provides or outputs actual robot operations data AROD, which data may be made up of all of the above-mentioned signals. It may also include a clock used to time stamp the signals as they are received.

The robot control unit 38, which may as an example be provided in the form of a processor with associated computer program code, comprises a number of robot instructions I1, I2, I3 and I4, where an instruction is a set of computer program comprising code, which when run by the processor causes the robot to perform a corresponding activity. Such an instruction may for instance be provided in Rapid code. An instruction may provide an io signal, which may be used for influencing another entity. An instruction may also be an instruction to read a physical io signal, such as an io signal from a sensor. An instruction may also be used for setting a variable in order to indicate a state, such as a counter for the number of produced products or a counter for counting the number of stops in a specific position.

A first instruction I1 may therefore as an example be an instruction for the robot 10 to perform a first activity along the robot movement path between the first and the second location and a second instruction I2 may be an instruction for handling a fault situation occurring in relation to the first instruction I1, i.e. for handling the situation where the robot is for some reason unable to complete the activity ordered by the first instruction. The third instruction I3 may as an example be an instruction for the robot to perform a final activity along the robot movement path and the fourth instruction I4 may be an instruction for handling a fault situation occurring in relation to the third instruction I3, i.e. for handling the situation that the robot is for some reason unable to complete the activity ordered by the third instruction. It should here be realized that there may be several more such instructions in-between the second and third instructions I2 and I3.

The robot control unit 38 may furthermore be set to generate the signals S4, S5, S6 and S7 based on the instructions I1, I2, I3, I4 or as these instructions are processed. The signals are thus generated as the robot performs an activity in a production cycle. Here the fourth signal S4 is emitted if the robot 10 has initiated the activity of the first instruction I1, while the fifth signal S5 is emitted if the robot is unable to perform the activity ordered by the first instruction I1 and instead has to be controlled according to the second instruction I2. The sixth signal S6 is emitted if the robot has successfully completed the third instruction I3, while the seventh signal S7 is emitted if the robot has to perform the fourth instruction I4, i.e. is unable to perform the activity ordered by third instruction I3 and instead has to be controlled according to the fourth instruction I4. Each signal S4, S5, S6 and S7 may be generated through the use of a string of program code in the corresponding instruction or through an additional instruction being appended to the first, second, third or fourth instruction. The first instruction I1 may thus comprise a string in the beginning that causes the sending of the fourth signal S4 as soon as the first instruction I2 is being processed. The second and fourth instructions I2 and I4 may likewise comprise a string anywhere in the instruction but preferably in the beginning, which string causes the sending of the fifth or the seventh signals S5 and S7 when being passed in the processing of the corresponding instruction. The third instruction I3 may comprise a string at the end, which causes the sixth signal S6 to be sent as soon as processing of the third instruction I3 is finished.

The robot control unit may also generate further signals, in addition to the instruction related signals S4, S5, S6 and S7. It may for instance be possible to set the robot in an Auto or a Manual mode, where the auto mode involves performing a program, such as the production of a product, and manual mode is manual control of the robot. The robot may also be in "Motors on" or "Motors off" mode, where the "Motors on" mode involves the motors that actuate the robot being energized. Further modes involve that the program with robot instructions is running or being stopped or that the program is running but the robot is awaiting some kind of input. The robot control unit may generate a signal corresponding to one or all of these modes.

It should be realized that several more signals can be generated in the same or similar fashion in relation to other robot control instructions. It is for instance possible that instructions, possibly all instructions, handling deviating robot behavior are to generate a signal.

Figure 4:
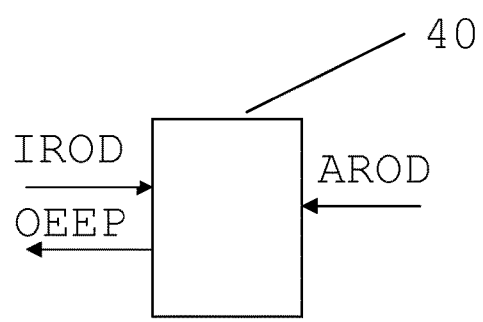

FIG. 4 schematically shows an overall equipment effectiveness determining unit 40 of an effectiveness determining device, which device in a first embodiment of the invention is the remote service server 28. The overall equipment effectiveness determining unit 40 receives the actual robot operations data AROD from the data collector. It also receives ideal robot operations data IROD, which may be received from the customer computer via the user interface. The overall equipment effectiveness determining unit 40 in turn provides an overall equipment effectiveness presentation DEEP to the customer computer. This presentation is provided based on the actual robot operations data AROD and the ideal robot operations data IROD.

Figure 5:
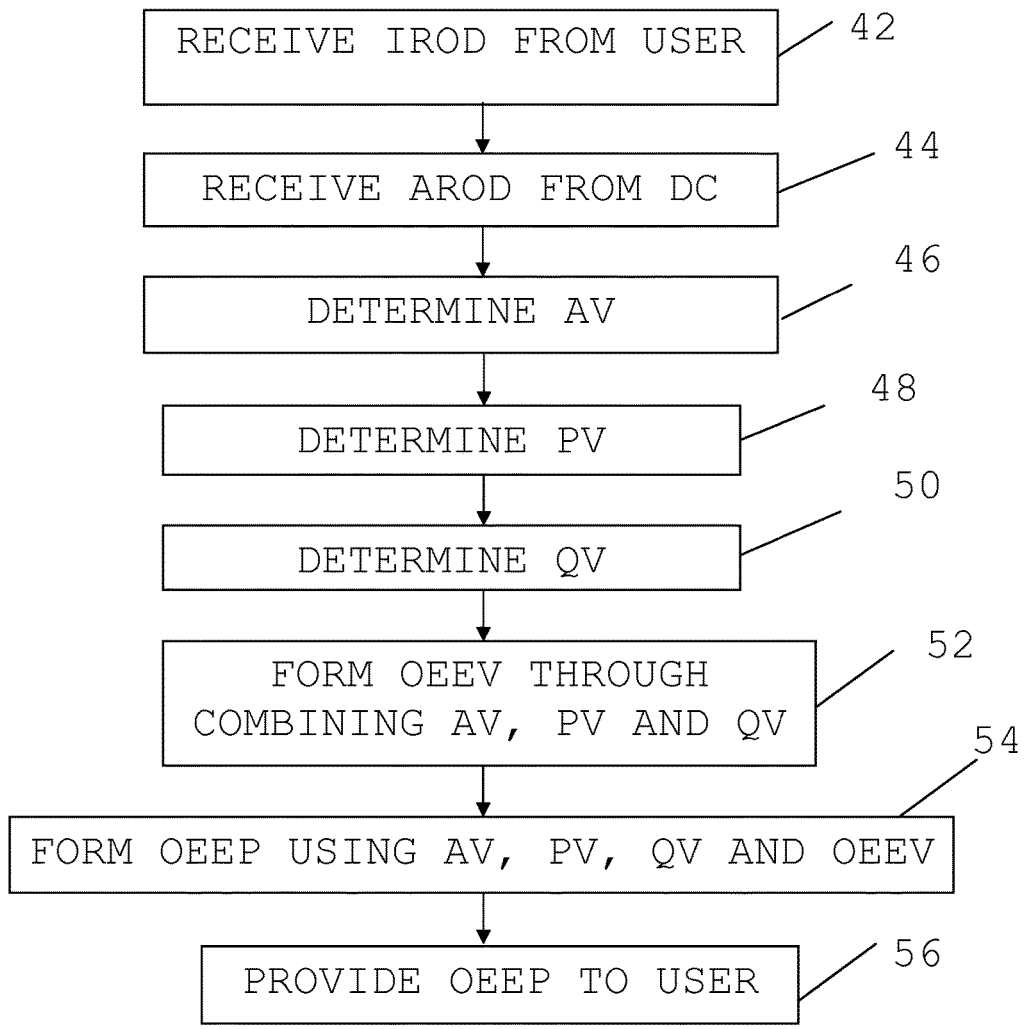
FIG. 5 shows a number of method steps being performed in a method for determining overall equipment effectiveness and being carried out in the overall equipment effectiveness determining unit, and FIG. 6 schematically shows a computer program product in the form of a CD Rom disc comprising computer program code for performing the functionality of the effectiveness determining unit when being loaded into a processor.

How this can be done will now be described in more detail with reference also being made to FIG. 5, which shows a flow chart of a number of method steps in a method for determining overall equipment effectiveness and being performed in the overall equipment effectiveness determining unit.

The method starts with the overall equipment effectiveness determining unit 40 obtaining ideal robot operations data IROD from a user, step 42. This obtaining may involve receiving the data through a user specifying the ideal robot operations data IROD via a user interface 32. This may be done through the user using the customer computer 34 and accessing a web site provided by the remote service server 28 using a URL. Via the user interface 32 provided in this way, the user may then enter such data. The data may comprise scheduled operations data, such as scheduled production start and stop times, i.e. when the robot 10 is to be operative and not and ideal production cycle time i.e. an ideal time or within which a production cycle should be completed.

The overall equipment effectiveness determining unit 40 then obtains actual robot operations data AROD of the robot cell 16, which may involve receiving the actual robot operations data AROD from the data collector 36 of the robot controller 24, step 44. This data is thus received and handled in relation to a process cycle. The actual robot operations data may more particularly comprise production start and end times. The second sensor 20 may for instance generate the second signal S2 each time an object 26 is fetched from the first location A and the third sensor 22 may generate the third signal S3 as a product is placed at the second location B. These signals, possibly time stamped, may then be forwarded by the data collector 36 for obtaining measured production cycle start and measured production end times. As an alternative, the fourth signal S4 and the time at which it is received by the data collector 36 could be used as measured production start time. In an analogous manner, the sixth signal S6 and the time at which it is received by the data collector 36 may be provided as measured production end time. These were just some examples on how measured production start and end times may be obtained. There are several other ways in which such data may be obtained.

The actual robot operations data AROD may also comprise robot stoppage data. The first sensor 18 may generate the first signal S1 when the door to the robot cell 16 is open, which means that a human is inside the cell. This signal along with the start and end time of it may be such robot stoppage data, in that the robot may not be allowed to operate when the cell door is open. The second and fourth instructions I2 and I4, which are being used when the robot is for some reason unable to perform activities according to the first or the third instructions I1 and I3, may also be used to form robot stoppage data. The time interval between the time at which the fifth or seventh signal S5 and S7 is received by the data collector 36 and the time when normal robot operations resumes, which may be the time at which the fourth signal S4 is received by the data collector 36, may also form robot stoppage data. These were just some examples on how robot stoppage data may be obtained. There are several other ways in which such data may be obtained. It may for instance be obtained based on the robot being in Manual mode, "Motors off" mode, robot instructions being stopped or the program is running but the robot is waiting for input. Here signals concerning auto mode, "Motors on" mode and mode of the program with robot instructions running may be used to determine the time the robot is functioning correctly. The actual robot operations data AROD may also comprise indications of unsuccessful production cycles. Such indications may be provided through the fifth and seventh signals S5 and S7.

The actual robot operations data AROD may also comprise indications of successfully completed production cycles. The sixth signal S6 may be considered as such a signal as it is emitted after the finishing of a production cycle. However, it is also possible that the third signal S3 may be used as such an indication. It is also possible that an indication is provided through a logical combination of various signals of a production cycle. A signal representing the end of a production cycle, such as the second or sixth signal S2 and S6 may be logically combined with all signals indicating an inability to perform an activity ordered by an instruction, where the fifth and the seventh signals S5 and S7 are examples on such signals indicating inability. An indication of a successfully completed production cycle may then only be obtained if a signal representing the end of a production cycle is present, but no indication of inability to perform activities. In a similar manner an indication of unsuccessful production cycles may be generated if there is at least one indication of inability to perform an activity, irrespective of if a signal representing the end of a production cycle is present or not. A signal generated when the robot is unable to perform an activity ordered by a robot control instruction may thus be used for determining an indication of an unsuccessful production cycle as well as for determining if an indication is to be an indication of a successfully completed production cycle or an indication of an unsuccessful production cycle.

These were just some examples on how indicators may be obtained. There are several other ways in which such indicators may be obtained. An unsuccessful production cycle indicator may be obtained through for instance using a sensor sensing that the robot is unable to perform an activity or performing an activity in a wrong way, such as sensing that a screw has not been screwed into the object, an insufficient amount of glue being applied during gluing or that an insufficient amount of pressure has been applied during curing of glue.

When the actual robot operations data AROD has been obtained the overall equipment effectiveness determination unit 40 continues and determines the overall equipment effectiveness of the robot cell based on the ideal robot operations data and the actual robot operations data. The determinations may be made repeatedly, where each determination is made based on the signals obtained in relation to one production cycle.

The determining of overall equipment effectiveness may involve determining an availability value AV, step 46. This availability value AV may be determined based on the scheduled operations data and robot stoppage data. The value AV may more particularly be determined as an actual production time divided by scheduled production time, where the actual production time may be determined as the scheduled production time minus relevant stoppage time. Relevant stoppage time would then be stoppage time obtained from stoppage data relating to a stoppage occurring during scheduled production. Stoppages occurring outside of the schedule are then not considered. Thus only stoppage data occurring during a scheduled operation is considered in the determining of the availability value.

The determining of overall equipment effectiveness may also involve determining a performance value PV, step 48. The performance value PV may be determined based on the ideal production cycle time, measured production cycle start and stop times and production cycle stoppage times. The measured production cycle start and stop times and the production cycle stoppage times may be used for determining an actual production cycle time. The performance value PV may then be determined as the actual production cycle time divided by the ideal production cycle time.

The determining of overall equipment effectiveness may further involve determining a quality value QV, step 50. The quality value QV may be determined based on indications of successfully completed production cycles and indications of unsuccessful production cycles. The value may more particularly be determined as the number of unsuccessful production cycles divided by the number of successfully completed production cycles.

The determining of overall equipment effectiveness may finally involve forming an overall equipment effectiveness value OEEV, step 52. This value may be formed through combining the availability value AV, the performance value PV and the quality value QV. The combination may as an example involve that the values are multiplied with each other.

When the overall operations effectiveness determining unit 40 in this way has determined the overall equipment effectiveness of the robot cell, it may then proceed and provide a presentation. In its simplest form the presentation may only comprise the overall operations effectiveness value OEEV. As an alternative the presentation may be elaborate. The presentation may be provided as a change of the various values over time, which may be presented in different graphs.

When this has been done it is then possible to provide the presentation for the user, step 56. This may be done through making the presentation accessible via the user interface 32. In this way it is possible for the user to see the presentation of the overall effectiveness, whenever there is an interest.

It should here be realized that the ideal operations data may only be inputted once and then the overall operations effectiveness determining unit continually collects data from the robot cell and determines the overall effectiveness. It is of course possible for the user to update the ideal operations data if he or she feels that it is necessary. The user can thus obtain current overall effectiveness calculations with a very low effort since most of the data needed is obtained automatically from the robot cell. The determined overall equipment effectiveness is also easily accessed. There is no need for the user to be close to the robot cell, but the data can be easily obtained wherever the user is located.

The invention is also easy to implement, since it employs already existing elements associated with a robot cell.

There are a number of variations that is possible to make of the invention. It should for instance be realized that if a plant comprises several robot cells, it is then possible to determine aggregated values for the collection of cells.

Another possible variation is that the efficiency determining device is the robot controller instead of the remote service server. In this case the overall equipment effectiveness determining unit is thus provided in the robot controller. In this case the user may be a robot operator inputting relevant data into the robot controller and receive the overall equipment effectiveness presentation via a display of the robot controller.

The invention is also directed towards an arrangement for determining overall equipment effectiveness of a robot cell for at least on industrial robot. In the simplest version of the arrangement, it only comprises the efficiency determining device, for instance when the efficiency determining device is implemented in the robot controller. However, the arrangement may as an alternative comprise both the robot controller and the remote service server.

Figure 6:
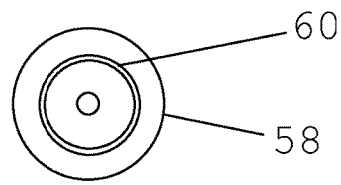

The overall equipment effectiveness determining unit may be provided in the form of one or more processors together with computer program memory including computer program code for performing its function. As an alternative it may be provided in the form of an Application Specific Integrated Circuit (ASIC) or Field-Programmable Gate Array (FPGA). This computer program code may also be provided on one or more data carriers which perform the functionality of the overall equipment effectiveness determining unit when the program code thereon is being loaded in a computer forming the effectiveness determining device. One such data carrier 58 with computer program code 60, in the form of a CD ROM disc, is schematically shown in FIG. 6. Such computer program may as an alternative be provided on a server and downloaded therefrom into the computer forming the effectiveness determining device. It should be realized that also the data collector may be formed in the same way.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for determining overall equipment effectiveness of a robot cell comprising at least one industrial robot involved in producing products, the method comprising the steps of:
    collecting signals generated through processing, in a robot controller, of robot control instructions controlling activities of the at least one industrial robot;
    obtaining ideal robot operations data of the robot cell;
    obtaining actual robot operations data of the robot cell, the actual robot operations data comprising the collected signals; and
    determining the overall equipment effectiveness of the robot cell based on the ideal robot operation data and the actual robot operations data;
    wherein the step of collecting signals is performed as the least one industrial robot performs a production cycle.

2. The method according to claim 1, wherein the ideal robot operations data comprises scheduled operation data, the actual robot operations data comprises robot stoppage data and the step of determining overall equipment effectiveness comprises determining an availability value based on the scheduled operation data and robot stoppage data, where only stoppage data occurring during a scheduled operation is used.

3. The method according to claim 2, wherein the ideal robot operations data comprises an ideal production cycle time, the actual robot operations data comprises production cycle start times, production cycle end times and production cycle stoppage times and the determining of overall equipment effectiveness comprises determining a performance value based on the ideal production cycle time, measured production cycle start and stop times and production cycle stoppage times.

4. The method according to claim 3, wherein actual robot operations data comprises an indication of a successfully completed production cycle and an indication of an unsuccessful production cycle and the step of determining overall equipment effectiveness comprises determining a quality value based on indications of successfully completed production cycles and indications of unsuccessful production cycles.

5. The method according to claim 4, wherein the determining of overall equipment effectiveness comprises combining the availability value, the performance value and the quality value in order to obtain an overall equipment effectiveness value.

6. The method according to claim 1, wherein the method is performed by a remote service server communicating, via a communication network, with the robot controller at the robot cell;
wherein the step of obtaining ideal robot operations data comprises receiving, via a user interface, a user specification of said ideal robot operations data; and
wherein the step of obtaining actual robot operations data comprises receiving said actual robot operations data from the robot controller.

7. The method according to claim 1, further comprising presenting the overall equipment effectiveness.

8. The method according to claim 1, wherein at least one signal is a signal generated when the at least one industrial robot is unable to perform an activity ordered by a robot control instruction and this signal is used for determining an indication of an unsuccessful production cycle.

9. The method according to claim 8, wherein the signal is used for determining if an indication is to be an indication of a successfully completed production cycle or an indication of an unsuccessful production cycle.

10. An arrangement for determining overall equipment effectiveness of a robot cell comprising at least one industrial robot involved in producing products, the arrangement comprising:
an effectiveness determination device, the effectiveness determination device comprising an overall equipment effectiveness determining unit configured to:
obtain ideal robot operations data of the robot cell;
obtain actual robot operations data of the robot cell; and
determine the overall equipment effectiveness based on the ideal robot operations data and the actual robot operations data; and
a robot controller with a data collector configured to collect signals generated as the at least one industrial robot performs a production cycle and supply the overall equipment effectiveness determining unit with actual robot operations data comprising said signals, wherein the signals comprise signals generated through processing, in the robot controller, of robot control instructions controlling activities of the at least one industrial robot.

11. The arrangement according to claim 10, wherein at least one signal is a signal generated when the at least one robot is unable to perform an activity ordered by a robot control instruction and the overall equipment effectiveness determining unit is configured to use this signal for determining an indication of an unsuccessful production cycle.

12. The arrangement according to claim 11, wherein the overall equipment effectiveness determining unit is configured to use the signal when determining if an indication is to be an indication of a successfully completed production cycle or an indication of an unsuccessful production cycle.

13. The arrangement according to claim 10, further comprising a remote service server providing a user interface, via which the ideal robot operations data are obtained and the overall equipment effectiveness are presented.

14. The arrangement according to claim 13, wherein the remote service server is the effectiveness determination device.

15. The arrangement according to claim 10, wherein the robot controller is the effectiveness determination device.

16. A non-transitory computer-readable storage medium on which there is stored a computer program product for determining overall equipment effectiveness of a robot cell comprising at least one industrial robot involved in producing products, the computer program product comprising a data carrier with computer program code which when run in an effectiveness determining device, causes the effectiveness determining device to:
collect signals generated through processing, in a robot controller, of robot control instructions controlling activities of the at least one industrial robot;
obtain ideal robot operations data of the robot cell;
obtain actual robot operations data of the robot cell, the actual robot operations data comprising the collected signals; and
determine the overall equipment effectiveness of the robot cell based on the ideal robot operations data and the actual robot operations data;
wherein the step of collecting signals is performed as the least one industrial robot performs a production cycle.

* * * * *